(12) United States Patent
Ishiguro

(10) Patent No.: US 9,022,668 B2
(45) Date of Patent: May 5, 2015

(54) OPTICAL CONNECTOR HAVING SHUTTER MECHANISMS CAPABLE OF EFFECTIVELY PREVENTING ENTRY OF DUST

(71) Applicant: Japan Aviation Electronics Industry, Limited, Tokyo (JP)

(72) Inventor: Masaki Ishiguro, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 14/141,525

(22) Filed: Dec. 27, 2013

(65) Prior Publication Data
US 2014/0294348 A1 Oct. 2, 2014

(30) Foreign Application Priority Data
Mar. 26, 2013 (JP) ................. 2013-064621

(51) Int. Cl.
*G02B 6/38* (2006.01)
(52) U.S. Cl.
CPC ............ *G02B 6/3893* (2013.01); *G02B 6/3821* (2013.01); *G02B 6/3849* (2013.01); *G02B 6/3878* (2013.01)
(58) Field of Classification Search
CPC .. G02B 6/3825; G02B 6/3893; G02B 6/3885; G02B 6/3897; G02B 6/3821; G02B 6/38
USPC .................... 385/53, 55, 56, 58, 60
See application file for complete search history.

(56) References Cited

U.S. PATENT DOCUMENTS 8,708,579 B2 * 4/2014 Shiratori et al. ................ 385/93

FOREIGN PATENT DOCUMENTS

JP 2004-246096 A 9/2004

* cited by examiner

*Primary Examiner* — Jennifer Doan
(74) *Attorney, Agent, or Firm* — Collard & Roe, P.C.

(57) ABSTRACT

Each of a plug and a receptacle is provided with an optical contact and a shutter mechanism. The shutter mechanisms are linkaged with each other when connecting the plug and the receptacle to each other. At least one of the plug and the receptacle includes a movable member moved with being pushed by the other of the plug and the receptacle, an urging member constantly urging the movable member toward the other of the plug and the receptacle, and a cam mechanism causes the shutter mechanism to follow movement of the movable member. The shutter mechanism includes a shutter plate having an opening and movable between a first position where the opening does not face the optical contact and a second position where the opening faces the optical contact, and a projection adapted to be fitted into the opening when the shutter plate is in the first position.

10 Claims, 15 Drawing Sheets

OPTICAL CONNECTOR HAVING SHUTTER MECHANISMS CAPABLE OF EFFECTIVELY PREVENTING ENTRY OF DUST

This application is based upon and claims the benefit of priority from Japanese Patent Application No. 2013-064621, filed Mar. 26, 2013, the disclosure of which is incorporated herein in its entirety by reference.

BACKGROUND OF THE INVENTION

1. Field of the Invention

This invention relates to an optical connector for use in achieving optical connection.

2. Description of Related Art

An optical connector is not always used indoors but is often used outdoors. When an optical connector used outdoors is disengaged, mud, dust, or the like accumulated around it may rise simultaneously with the disengagement. In that case, entry of the dust or the like into the optical connector cannot be avoided. This may adversely affect the transmission characteristics or make end faces of optical fibers dirty or damaged, thus reducing the life of the optical connector.

In view of this, an optical connector having shutter mechanisms for protecting optical contact portions (hereinafter, this type of optical connector will be referred to as an "optical connector with shutters") is proposed in JP-A-2004-246096 (Patent Document 1).

Referring to FIG. 1, the optical connector with shutters described in Patent Document 1 will be briefly described. In FIG. 1, the optical connector with shutters comprises a plug 101 and a receptacle 102 which can be connected to each other. The plug 101 and the receptacle 102 respectively have shutter mechanisms 105 and 106 which are adapted to open and close the connection sides of optical contacts 103 and 104 having optical contact portions.

The shutter mechanism 105 of the plug 101 comprises a housing having a window plate 105a, and a rotatable shutter plate 105b disposed on the receptacle 102 side of the window plate 105a. The shutter mechanism 106 of the receptacle 102 comprises a housing having a window plate 106a, and a rotatable shutter plate 106b disposed on the plug 101 side of the window plate 106a. The shutter plates 105b and 106b each have openings. By rotation (i.e. movement in a rotational direction less than 360°) of each of the shutter plates 105b and 106b, it is possible to selectively obtain a "shutter-open" state where the openings face the optical contacts 103, 104 and a "shutter-closed" state where the openings are offset in position from the optical contacts 103, 104. The shutter plates 105b and 106b are configured to link with each other in the rotational direction when connecting the plug 101 and the receptacle 102 to each other.

According to the above-mentioned optical connector with shutters, the optical contact portions are protected by the shutter mechanisms and therefore it is possible to reduce man-hours required for maintenance and management.

SUMMARY OF THE INVENTION

However, in the case of the optical connector with shutters of Patent Document 1, even in a state where the plug and the receptacle are not connected to each other, it is possible to rotate each shutter plate from the outside, for example, by hand. Therefore, there is a possibility of the occurrence of an accidental "shutter-open" state so that dust may enter the inside of the optical connector through the openings of the shutter plate.

Further, in a "shutter-closed" state, while the openings of the shutter plate are closed by the window plate, recesses are formed at portions corresponding to the openings due to level difference between the window plate and the shutter plate. Dust tends to collect in these recesses and cleaning is difficult. Consequently, there is a possibility that the dust in the recesses may enter the inside of the optical connector through the openings of the shutter plate when shifting to a "shutter-open" state.

It is therefore an object of this invention to provide an optical connector with shutters that can solve the above-mentioned problems.

Other objects of this invention will become clear as the description proceeds.

According to an aspect of this invention, there is provided an optical connector comprising a plug and a receptacle adapted to be connected to each other in an axial direction, wherein each of the plug and the receptacle comprises an optical contact and a shutter mechanism for opening and closing a front of the optical contact in the axial direction, wherein the optical connector has linkage means for linking the shutter mechanism of the plug with the shutter mechanism of the receptacle when connecting the plug and the receptacle to each other, wherein at least one of the plug and the receptacle comprises a movable member which is adapted to be moved with being pushed by the other of the plug and the receptacle when connecting the plug and the receptacle to each other; an urging member constantly urging the movable member toward the other of the plug and the receptacle in the axial direction, and a cam mechanism adapted to cause the shutter mechanism to follow movement of the movable member, wherein the shutter mechanism comprises a shutter plate having an opening and movable between a first position where the opening does not face the optical contact in the axial direction and a second position where the opening faces the optical contact in the axial direction and a projection adapted to be fitted into the opening when the shutter plate is in the the first position.

BRIEF DESCRIPTION OF THE DRAWINGS

FIGS. 17A and 17B are explanatory diagrams for explaining the operation of the receptacle-side movable member of the receptacle shown in FIG. 2, wherein FIG. 17A shows a state where the receptacle is not connected to the plug while FIG. 17B shows a state where the receptacle is connected to the plug;

DESCRIPTION OF THE EXEMPLARY EMBODIMENTS

Figure 1:
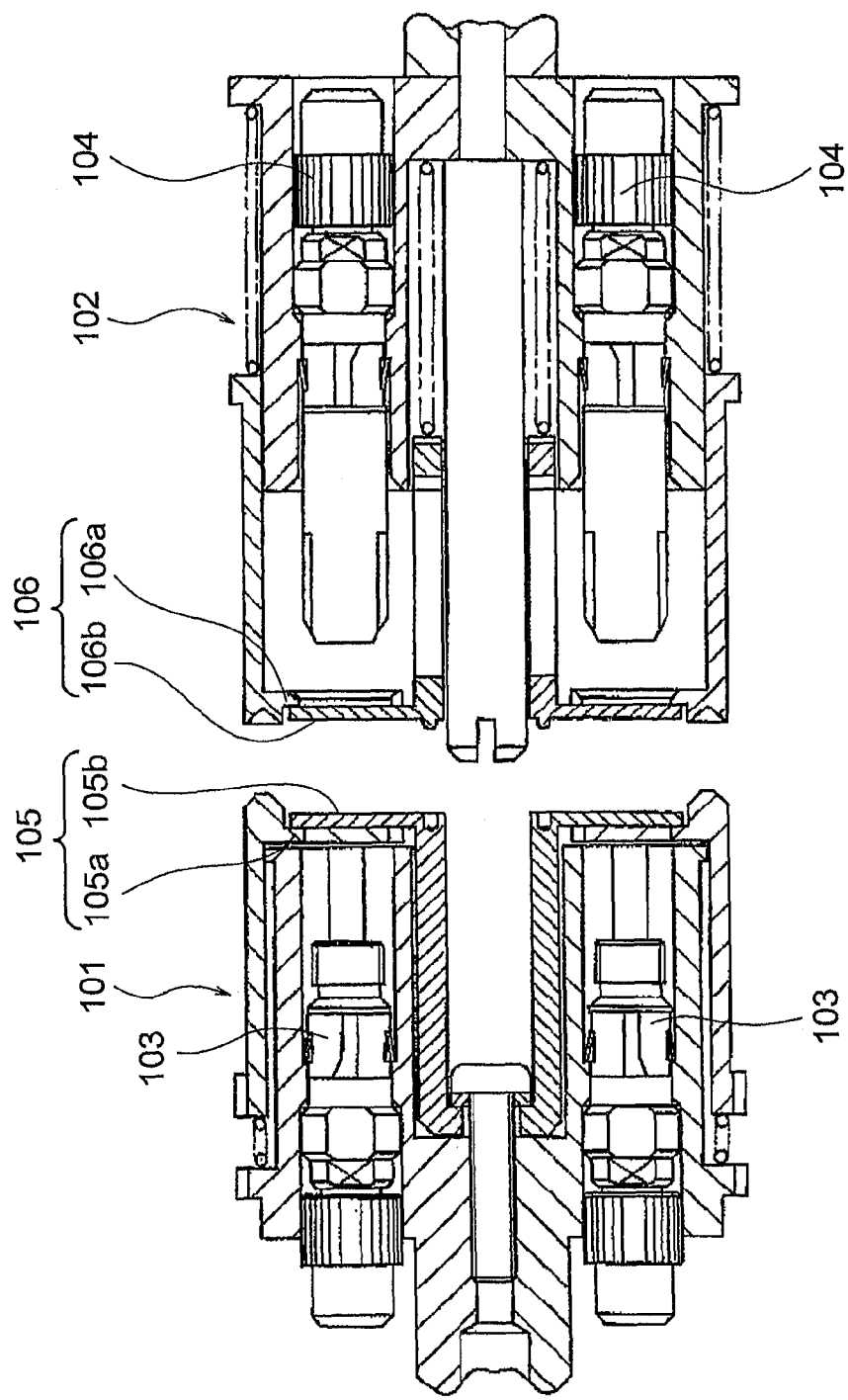
FIG. 1 is a longitudinal sectional view of an optical connector with shutters disclosed in Patent Document 1 (JP-A-2004-246096)

Referring to the drawings, an optical connector with shutters according to an embodiment of this invention will be described.

Figure 2:
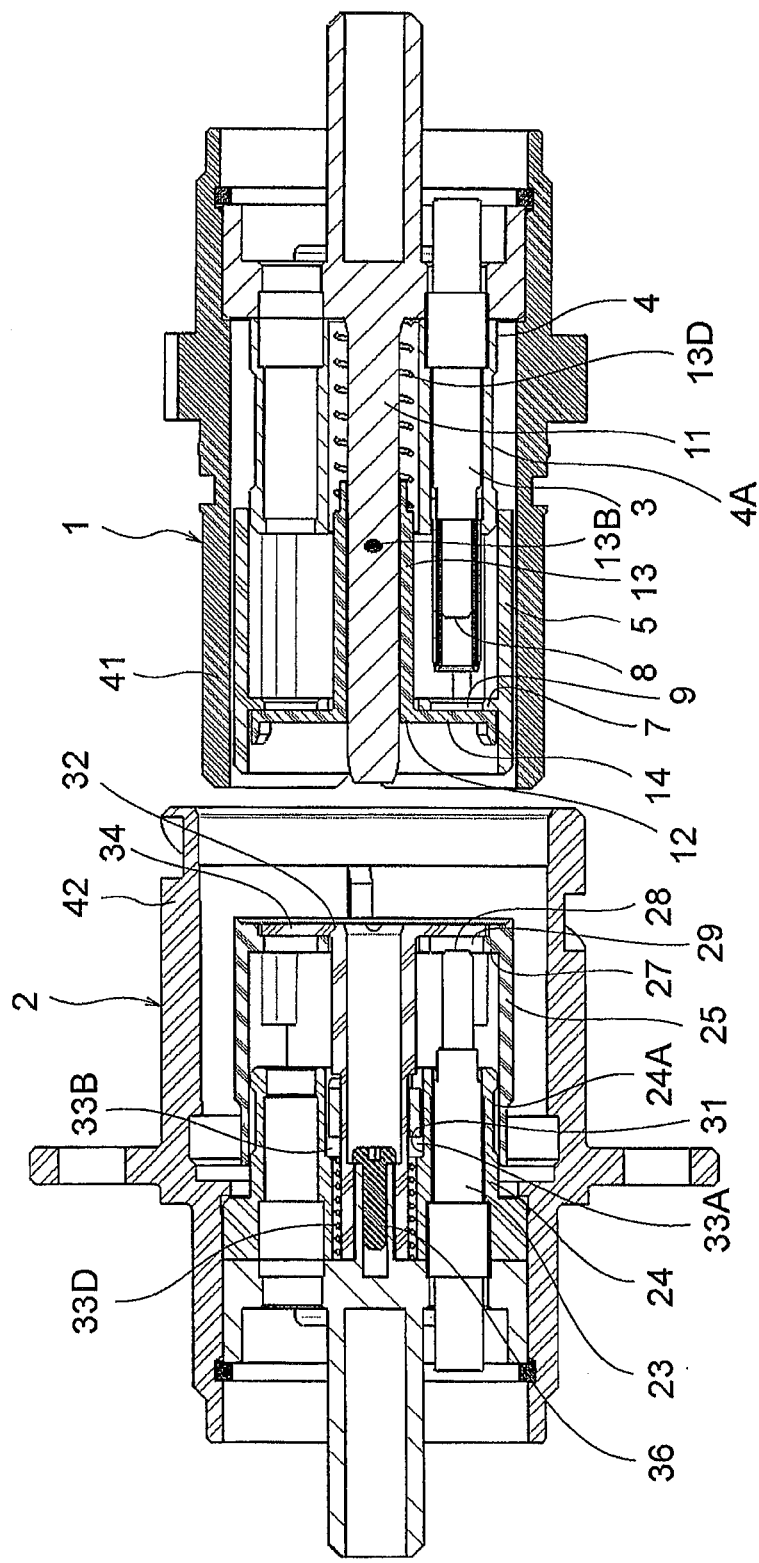
FIG. 2 is a longitudinal sectional view of an optical connector with shutters in a disconnected state according to an embodiment of this invention.

Referring to FIG. 2, the optical connector with shutters according to the embodiment of this invention comprises a plug 1 and a receptacle 2 which are adapted to be brought into face-to-face contact with each other for connection therebetween.

Figure 6:
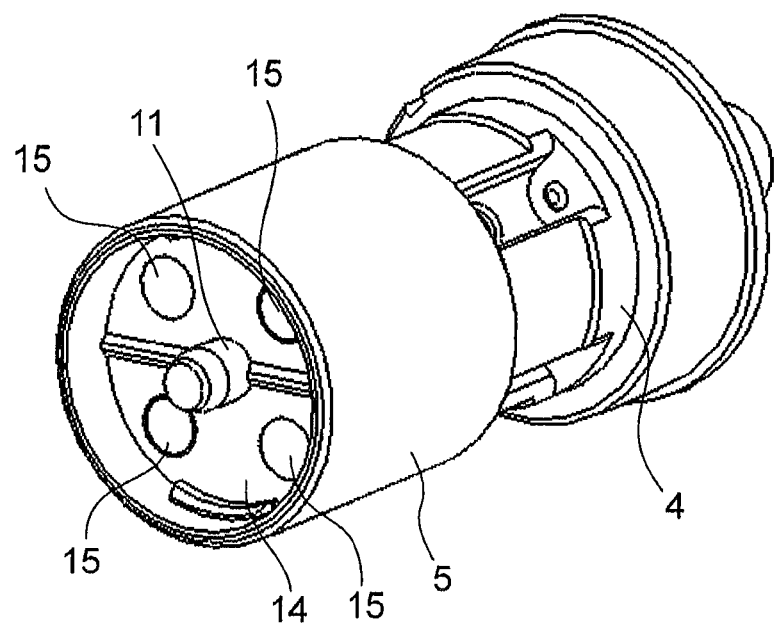
FIG. 6 is a perspective view of a plug shown in FIG. 2, wherein a barrel is removed.
Figure 7:
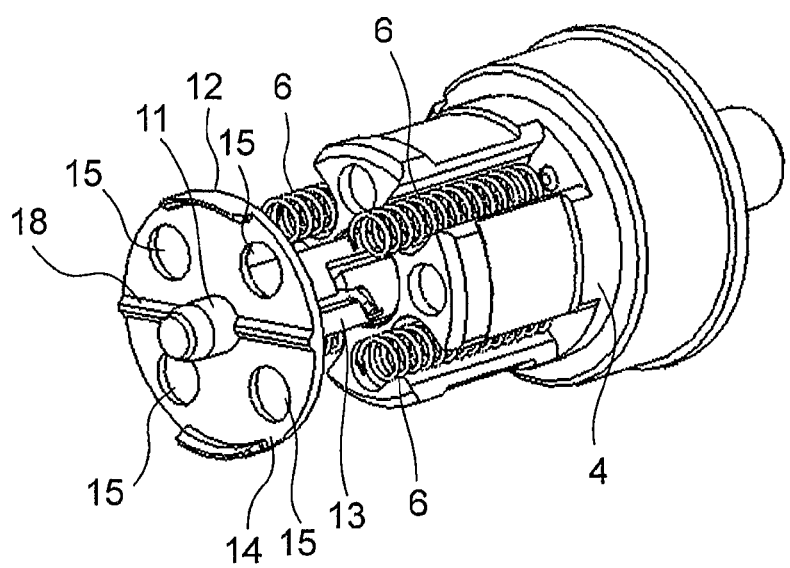
FIG. 7 is a perspective view of the plug shown in FIG. 2, wherein optical socket contacts and a plug-side front housing are further removed from FIG. 6.
Figure 8A:
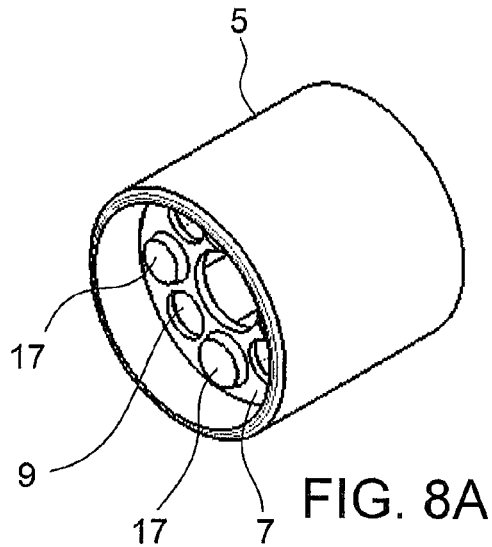
FIGS. 8A and 8B are perspective views, seen from different directions, of the plug-side front housing of the plug shown in FIG. 2.
Figure 8B:
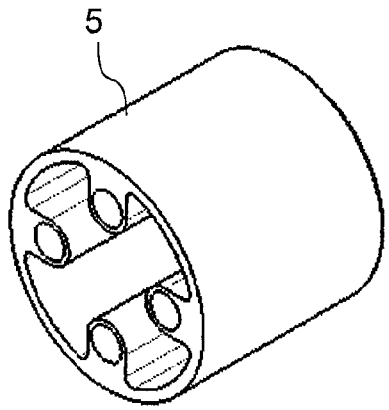
Figure 8C:
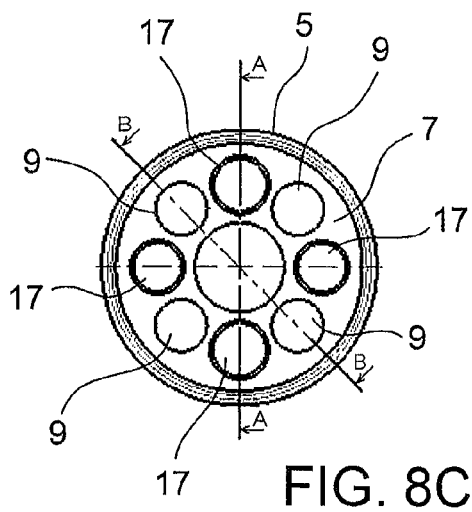
FIG. 8C is a left side view of the plug-side front housing of FIGS. 8A and 8B.
Figure 8D:
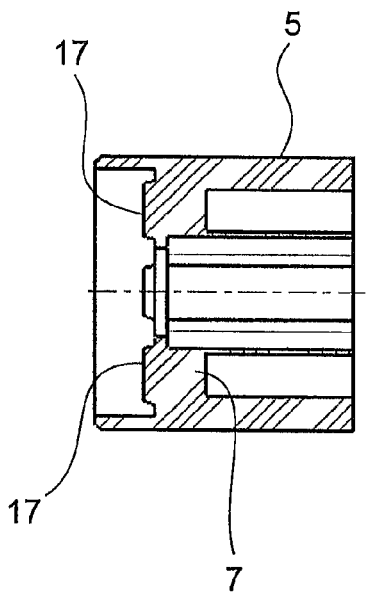
FIG. 8D is a cross-sectional view taken along line A-A of FIG. 8C.
Figure 8E:
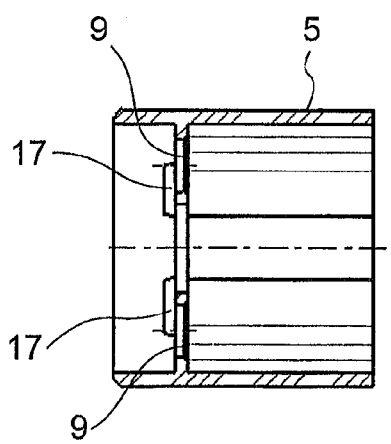
FIG. 8E is a cross-sectional view taken along line B-B of FIG. 8C.

The plug 1 comprises a plurality of, i.e. four, optical socket contacts 3 arranged on a predetermined circumference and each extending in a predetermined direction or an axial direction (left-right direction in FIG. 2). The optical socket contacts 3 are fixedly held by an insulating plug-side rear housing 4 serving as a fixed holding member. The plug-side rear housing 4 may be conductive and made of a metal or the like. As also shown in FIG. 6, a barrel-shaped plug-side front housing 5 is fitted around the outer periphery of the plug-side rear housing 4 so as to be slidable in the axial direction. The plug-side front housing 5 is prevented from rotating relative to the plug-side rear housing 4 and is biased toward the receptacle 2 side by elastic members (biasing means) 6 in the form of coil springs shown in FIG. 7.

As a measure to counter wear powder which may be generated by the sliding of the plug-side front housing 5, the plug-side rear housing 4 has, at its outer periphery, groove portions 4A having a U-shape or concave shape in cross section and extending in the circumferential direction. With this structure, it is possible to reduce the contact area between the plug-side rear housing 4 and the plug-side front housing 5 and thus to suppress the generation of wear powder and, even if wear powder is generated, it is possible to store the generated wear powder in the groove portions 4A. Accordingly, no influence is exerted on the optical performance.

As shown in FIGS. 8A to 8E, an inward-facing plug-side window plate 7 is formed at an end portion, on the receptacle 2 side, of the plug-side front housing 5. The plug-side window plate 7 has four openings 9 each facing a corresponding one of optical contact portions 8 of the optical socket contacts 3. These openings 9 are arranged on a predetermined circumference.

Figure 10:
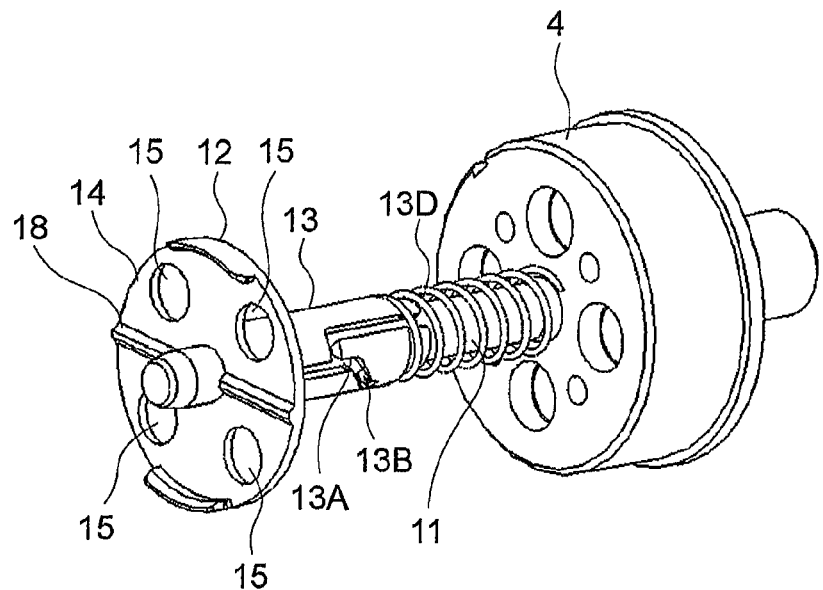
FIG. 10 is a perspective view showing the relationship between the plug-side movable member and a shaft of the plug shown in FIG. 2.

As also shown in FIG. 10, a shaft 11 extending in the axial direction is fixed to the center of the plug-side rear housing 4. A plug-side movable member 12 is slidably mounted on the shaft 11. A cam mechanism which will be described later is provided between the shaft 11 and the plug-side movable member 12. By this cam mechanism, the movement of the plug-side movable member 12 along the shaft 11 in the axial direction and the rotation of the plug-side movable member 12 about the shaft 11 are linked together.

Figure 9:
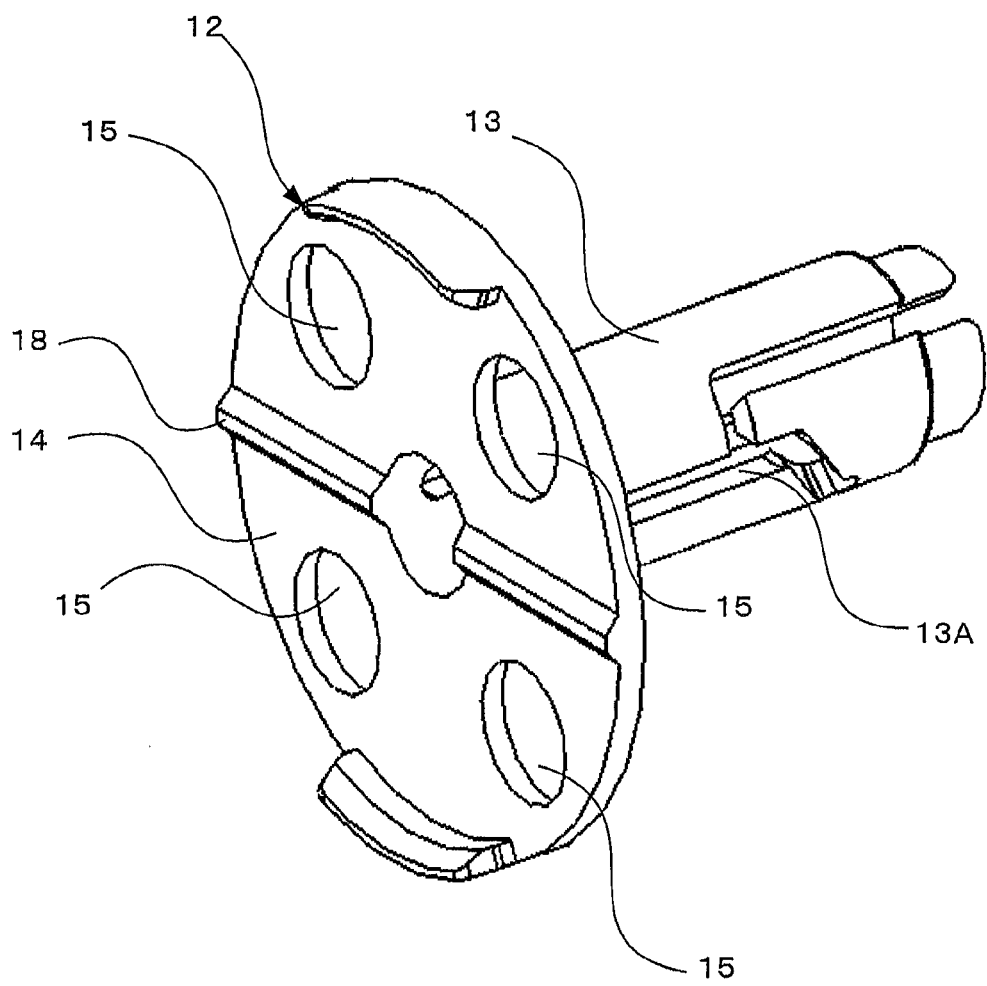
FIG. 9 is a perspective view of a plug-side movable member of the plug shown in FIG. 2.

As shown in FIG. 9, a disc-shaped plug-side shutter plate 14 is formed at an end portion, on the receptacle 2 side, of the plug-side movable member 12. The plug-side shutter plate 14 faces the plug-side window plate 7 and has four openings 15 arranged on a predetermined circumference. While the plug-side front housing 5 is, as described above, biased toward the receptacle 2 side by the elastic members 6, the plug-side front housing 5 is prevented from moving toward the receptacle 2 side by the plug-side shutter plate 14 in the state where the elastic members 6 are energized. The plug-side shutter plate 14 is formed on its outer surface with a small convex portion 18 extending in the diametrical direction.

In the state of FIG. 2, the openings 15 of the plug-side shutter plate 14 are offset in position in the circumferential direction with respect to the openings 9 of the plug-side window plate 7 and therefore the openings 9 are closed by the plug-side shutter plate 14. That is, FIG. 2 shows a "shutter-closed" state. When the plug-side shutter plate 14 is rotated, the openings 9 may be opened. In this manner, the plug-side shutter plate 14 and the plug-side window plate 7 jointly form a plug-side shutter mechanism. Jointly with the plug-side rear housing 4 and the plug-side front housing 5, the plug-side shutter mechanism surrounds the optical socket contacts 3.

As also shown in FIGS. 9 and 10, the plug-side movable member 12 further comprises a tubular portion 13 extending from the center of the plug-side shutter plate 14 to the side opposite to the receptacle 2 side. The tubular portion 13 is fitted around the outer periphery of the shaft 11 so as to be slidable in the axial direction. The tubular portion 13 is formed with a cam groove 13A. On the other hand, the shaft 11 has at its outer periphery a cam pin 13B which is inserted into the cam groove 13A (to be exact, since FIGS. 2 to 5 are sectional views, the cam pin 13B provided on the outer periphery of the shaft 11 cannot be seen, but its position is indicated by a black circle in these figures). The cam groove 13A is pressed against the cam pin 13B by a push spring 13D which is referred to as an urging member. When the tubular portion 13 is caused to slide along the shaft 11, the plug-side movable member 12 rotates as the cam groove 13A moves along the cam pin 13B. That is, the cam groove 13A and the cam pin 13B jointly form the above-mentioned cam mechanism. The shape of the cam groove 13A will be clear from a description of the operation which will be given later.

Further, as shown in FIGS. 8A to 8E, on a surface, facing the plug-side shutter plate 14, of the plug-side window plate 7, four projections 17 having a circular truncated cone shape are formed on the same circumference as the openings 9. That is, the plug-side window plate 7 is formed with the openings 9 and the projections 17 which are alternately arranged on the single circumference at regular intervals. These projections 17 have a shape and size so as to be snugly fittable into the openings 15 of the plug-side shutter plate 14 in one-to-one correspondence. The height of each projection 17 is designed to be substantially equal to the thickness of the plug-side shutter plate 14.

Figure 11:
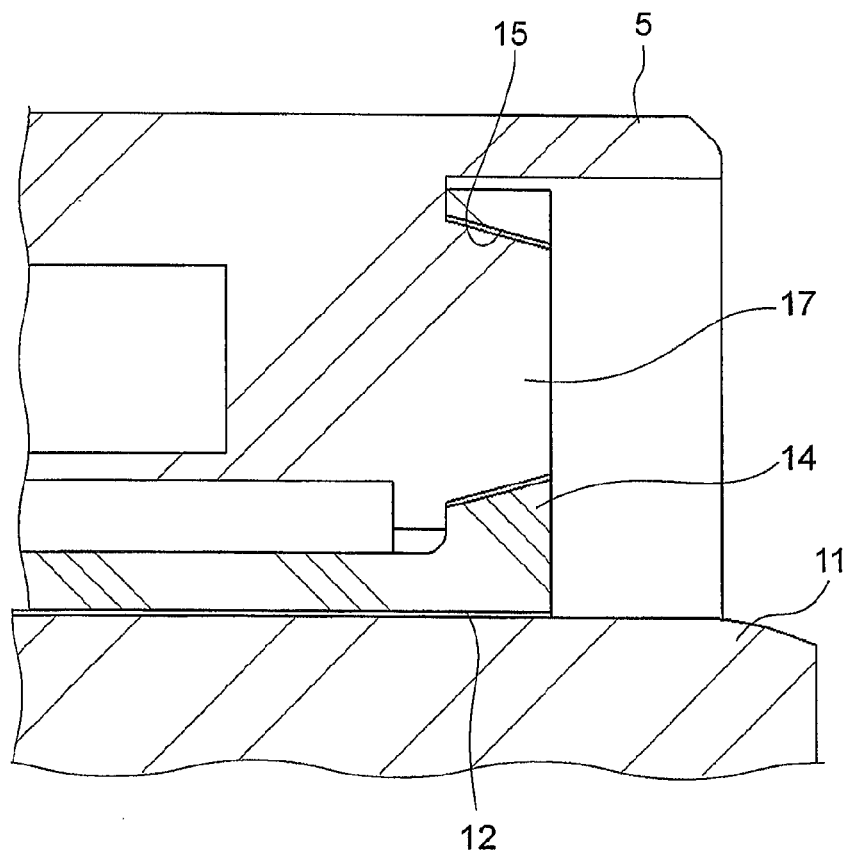
FIG. 11 is an enlarged cross-sectional view exaggeratedly showing the main part of the plug shown in FIG. 2.

In FIG. 2, the plug 1 is in a state where the plug-side shutter plate 14 is in a "shutter-closed" position (a first position) and where the projections 17 of the plug-side window plate 7 are fitted into the openings 15 of the plug-side shutter plate 14. As will be understood from FIG. 11 showing this state with only the main part given in an enlarged scale, each of the openings 15 are also designed to have a circular truncated cone shape as well as each projection 17.

In this "shutter-closed" state of the plug 1, since the projections 17 of the plug-side window plate 7 engage with the edges of the openings 15 of the plug-side shutter plate 14, the plug-side shutter plate 14 is locked so that there is no possibility of the occurrence of an accidental "shutter-open" state of the plug 1. Therefore, it is possible to prevent entry of dust into the plug 1 through the openings 15. Further, in the "shutter-closed" state of the plug 1, since there is no level difference or step on the outer surface of the plug-side shutter plate 14, dust is difficult to collect and cleaning is easy. Therefore, there is also no possibility that dust on the surface of the plug-side front housing 5 enters the inside of the plug 1 when opening the plug-side shutter plate 14.

Figure 12:
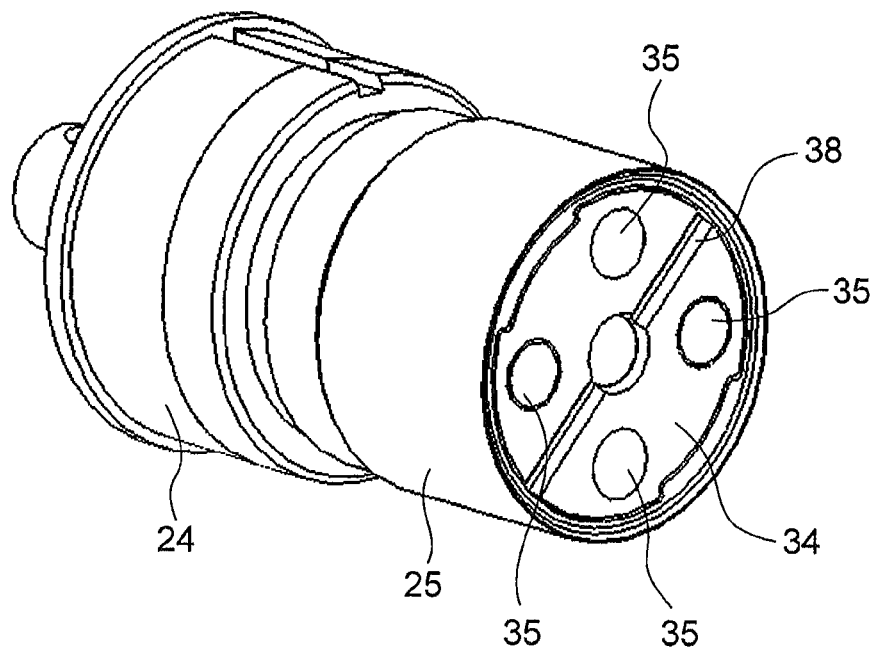
FIG. 12 is a perspective view of a receptacle shown in FIG. 2, wherein a barrel is removed.

On the other hand, the receptacle 2 comprises a plurality of, i.e. four, optical pin contacts 23 arranged on a predetermined circumference and each extending in the axial direction. The optical pin contacts 23 are fixedly held by an insulating or conductive (metal) receptacle-side rear housing 24 serving as a fixed holding member. As also shown in FIG. 12, a barrel-shaped receptacle-side front housing 25 is fitted around the outer periphery of the receptacle-side rear housing 24 so as to be slidable in the axial direction.

Figure 13:
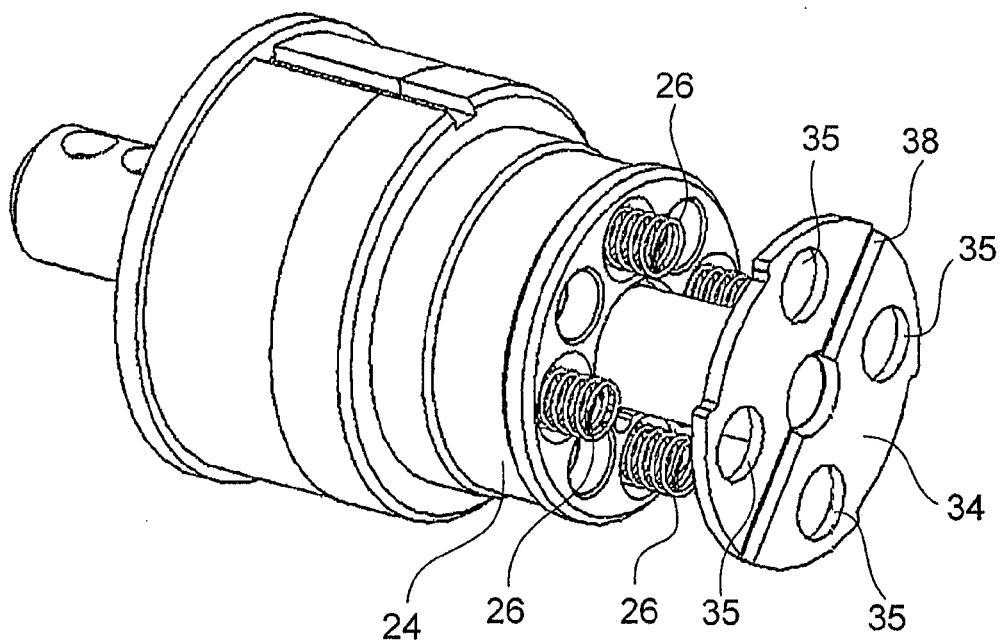
FIG. 13 is a perspective view of the receptacle shown in FIG. 2, wherein optical pin contacts and a receptacle-side front housing are further removed from FIG. 12.
Figure 14A:
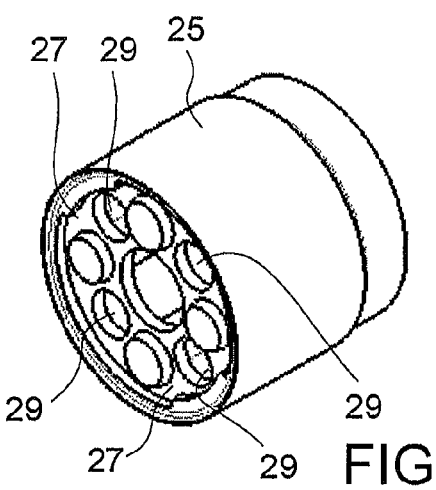
FIGS. 14A and 14B are perspective views, seen from different directions, of the receptacle-side front housing of the receptacle shown in FIG. 2.
Figure 14B:
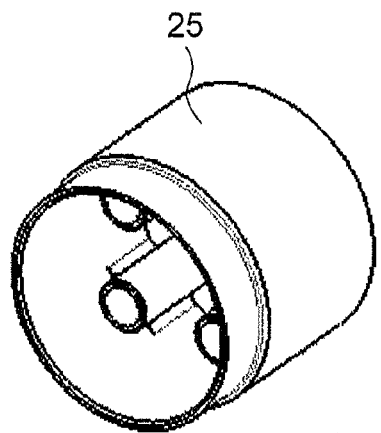
Figure 14C:
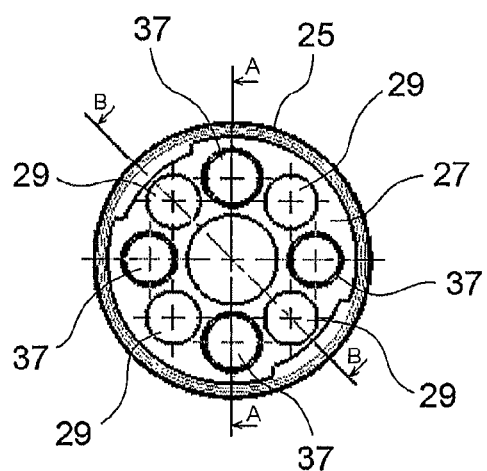
FIG. 14C is a left side view of the receptacle-side front housing of FIGS. 14A and 14B.
Figure 14D:
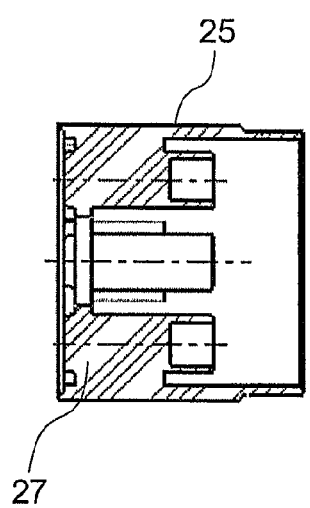
FIG. 14D is a cross-sectional view taken along line A-A of FIG. 14C.
Figure 14E:
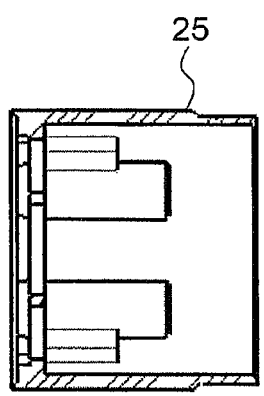
FIG. 14E is a cross-sectional view taken along line B-B of FIG. 14C.

The receptacle-side front housing 25 is prevented from rotating relative to the receptacle-side rear housing 24 and is biased toward the plug 1 side by elastic members (biasing means) 26 in the form of coil springs shown in FIG. 13.

As a measure to counter wear powder which may be generated by the sliding of the receptacle-side front housing 25, the receptacle-side rear housing 24 has at its outer periphery a groove portion 24A having a U-shape or concave shape in cross section and extending in the circumferential direction. With this structure, it is possible to reduce the contact area between the receptacle-side rear housing 24 and the receptacle-side front housing 25 and thus to suppress the generation of wear powder and, even if wear powder is generated, it is possible to store the generated wear powder in the groove portion 24A. Accordingly, no influence is exerted on the optical performance.

As shown in FIGS. 14A to 14E, an inward-facing receptacle-side window plate 27 is formed at an end portion, on the plug 1 side, of the receptacle-side front housing 25. The receptacle-side window plate 27 has four openings 29 each facing a corresponding one of optical contact portions 28 of the optical pin contacts 23. These openings 29 are arranged on a predetermined circumference.

Figure 15:
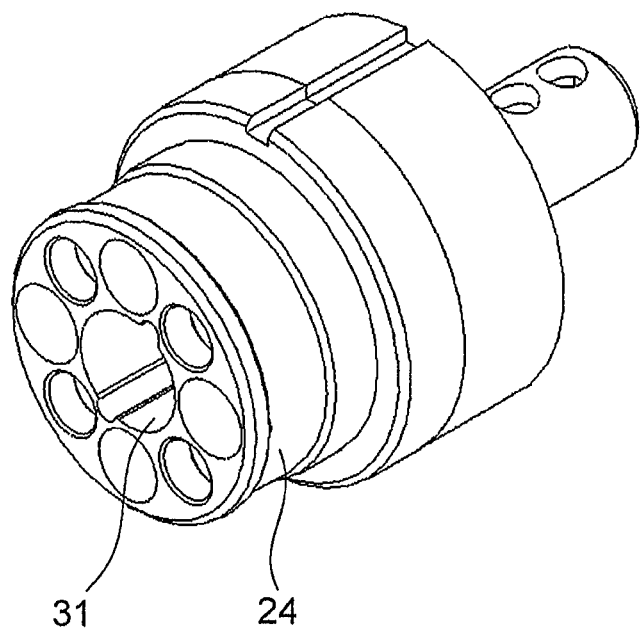
FIG. 15 is a perspective view of a receptacle-side rear housing of the receptacle shown in FIG. 2.

As shown in FIG. 15, a recess 31 extending in the axial direction is formed at the center of the receptacle-side rear housing 24. A receptacle-side movable member 32 is rotatably fitted into the recess 31. The receptacle-side movable member 32 is prevented from moving in the axial direction relative to the receptacle-side rear housing 24 by a pin 36.

Figure 16:
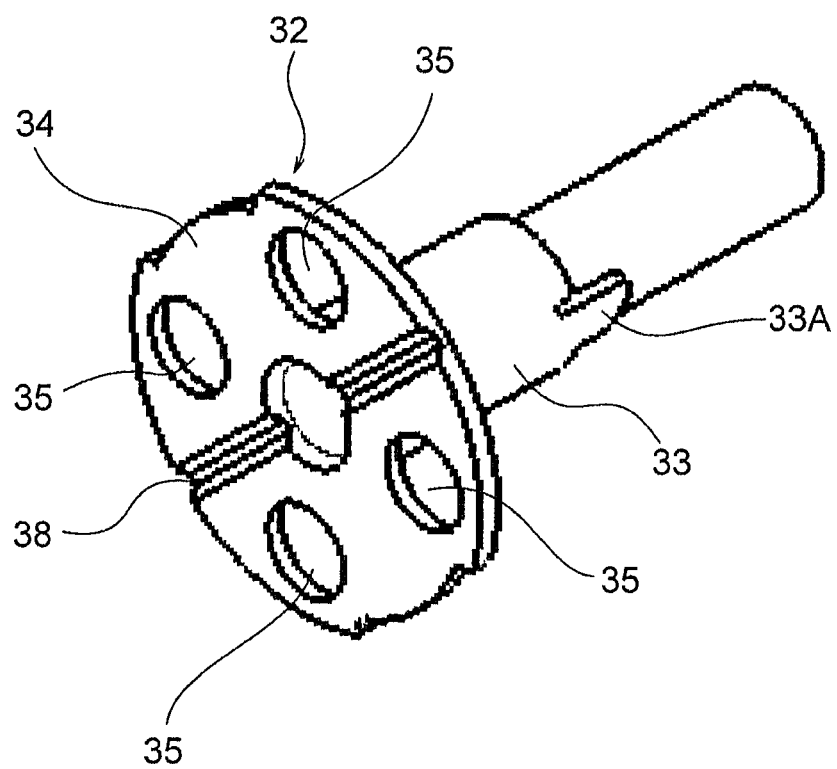
FIG. 16 is a perspective view of a receptacle-side movable member of the receptacle shown in FIG. 2.

As shown in FIG. 16, a disc-shaped receptacle-side shutter plate 34 is formed at an end portion, on the plug 1 side, of the receptacle-side movable member 32. The receptacle-side shutter plate 34 faces the receptacle-side window plate 27 and has four openings 35 arranged on a predetermined circumference. While the receptacle-side front housing 25 is, as described above, biased toward the plug 1 side by the elastic members 26, the receptacle-side front housing 25 is prevented from moving toward the plug 1 side by the receptacle-side shutter plate 34 in the state where the elastic members 26 are energized. The receptacle-side shutter plate 34 is formed on its outer surface with a small concave portion 38 extending in the diametrical direction. This small concave portion 38 has a shape and size so as to be fittable with the small convex portion 18 of the plug-side shutter plate 14.

In the state of FIG. 2, the openings 35 of the receptacle-side shutter plate 34 are offset in position in the circumferential direction with respect to the openings 29 of the receptacle-side window plate 27 and therefore the openings 29 are closed by the receptacle-side shutter plate 34. That is, FIG. 2 shows a "shutter-closed" state. When the receptacle-side shutter plate 34 is rotated, the openings 29 may be opened. In this manner, the receptacle-side shutter plate 34 and the receptacle-side window plate 27 jointly form a receptacle-side shutter mechanism. Jointly with the receptacle-side rear housing 24 and the receptacle-side front housing 25, the receptacle-side shutter mechanism surrounds the optical pin contacts 23.

As also shown in FIG. 16, the receptacle-side movable member 32 further comprises a tubular portion 33 extending from the center of the receptacle-side shutter plate 34 to the side opposite to the plug 1 side and serving as a rotary shaft. The tubular portion 33 is located in the recess 31 of the receptacle-side rear housing 24 and prevented from moving in the axial direction by the pin 36.

Figure 17A:
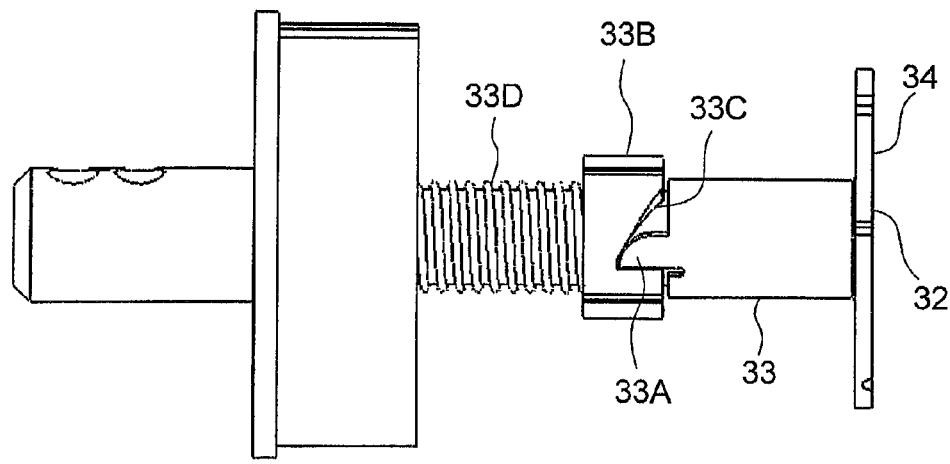
Figure 17B:
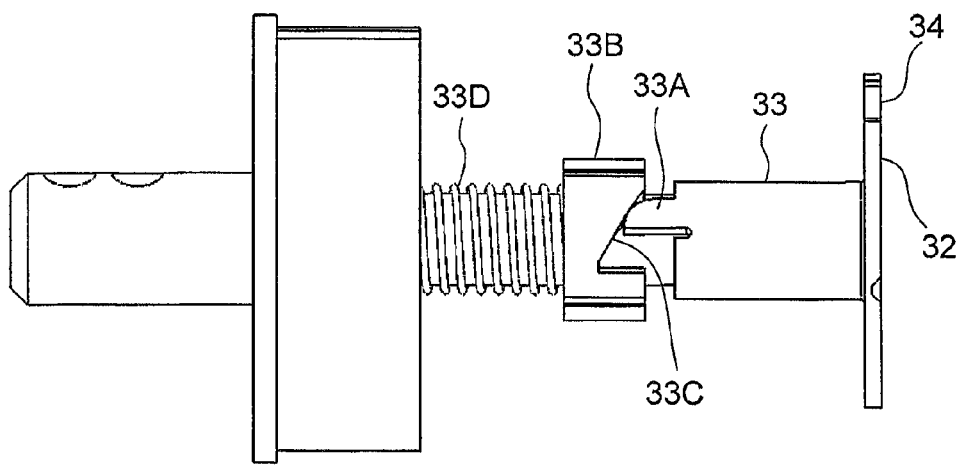

As shown in FIGS. 17A and 17B, the tubular portion 33 of the receptacle-side movable member 32 has a convex portion 33A at its outer periphery. Further, a tubular cam member 33B is fitted around the outer periphery of the tubular portion 33 so as to be slidable in the axial direction. The cam member 33B has a spiral cam surface 33C. The cam surface 33C is pressed against the convex portion 33A by a push spring 33D.

Further, as shown in FIGS. 14A to 14E, on a surface, facing the receptacle-side shutter plate 34, of the receptacle-side window plate 27, four projections 37 having a circular truncated cone shape are formed on the same circumference as the openings 29. That is, the receptacle-side window plate 27 is formed with the openings 29 and the projections 37 which are alternately arranged on the single circumference at regular intervals. These projections 37 have a shape and size so as to be fittable into the openings 35 of the receptacle-side shutter plate 34 in one-to-one correspondence. The height of each projection 37 is designed to be substantially equal to the thickness of the receptacle-side shutter plate 34.

In FIG. 2, the receptacle 2 is in a state where the receptacle-side shutter plate 34 is in a "shutter-closed" position (a first position) and where the projections 37 of the receptacle-side window plate 27 are fitted into the openings 35 of the receptacle-side shutter plate 34. This state is the same as that of the plug 1.

In this "shutter-closed" state of the receptacle 2, since the projections 37 of the receptacle-side window plate 27 engage with the edges of the openings 35 of the receptacle-side shutter plate 34, the receptacle-side shutter plate 34 is locked so that there is no possibility of the occurrence of an accidental "shutter-open" state of the receptacle 2. Therefore, it is possible to prevent entry of dust into the receptacle 2 through the openings 35. Further, in the "shutter-closed" state of the receptacle 2, since there is no level difference or step on the outer surface of the receptacle-side shutter plate 34, dust is difficult to collect and cleaning is easy. Therefore, there is also no possibility that dust on the surface of the receptacle-side front housing 25 enters the inside of the receptacle 2 when opening the receptacle-side shutter plate 34.

Figure 18:
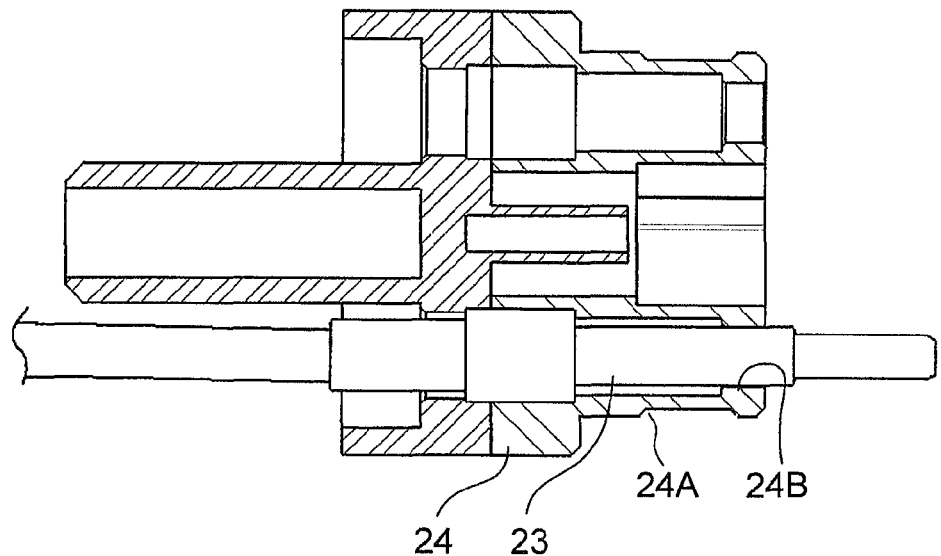
FIG. 18 is a cross-sectional view for explaining a structure, holding the optical pin contacts, of the receptacle shown in FIG. 2.

As shown in FIG. 18, the receptacle-side rear housing 24, which is the holding member holding the optical pin contacts 23, of the receptacle 2 is formed with stepped portions 24B each having a reduced inner diameter for supporting a corresponding one of the optical pin contacts 23. With this structure, each optical pin contact 23 can be inserted from a contact insertion opening having a larger diameter and therefore the assemblability of the receptacle 2 is improved. Further, since each optical pin contact 23 is supported by the stepped portion 24B having the reduced diameter, the inclination thereof does not affect the fitting of the plug 1 and the receptacle 2.

It is preferable that the plug-side rear housing 4, which is the holding member holding the optical socket contacts 3, of the plug 1 be also provided with a structure equivalent to the above-mentioned stepped portions 24B.

Next, a description will be given of the operation when connecting the plug 1 and the receptacle 2 to each other.

Figure 19:
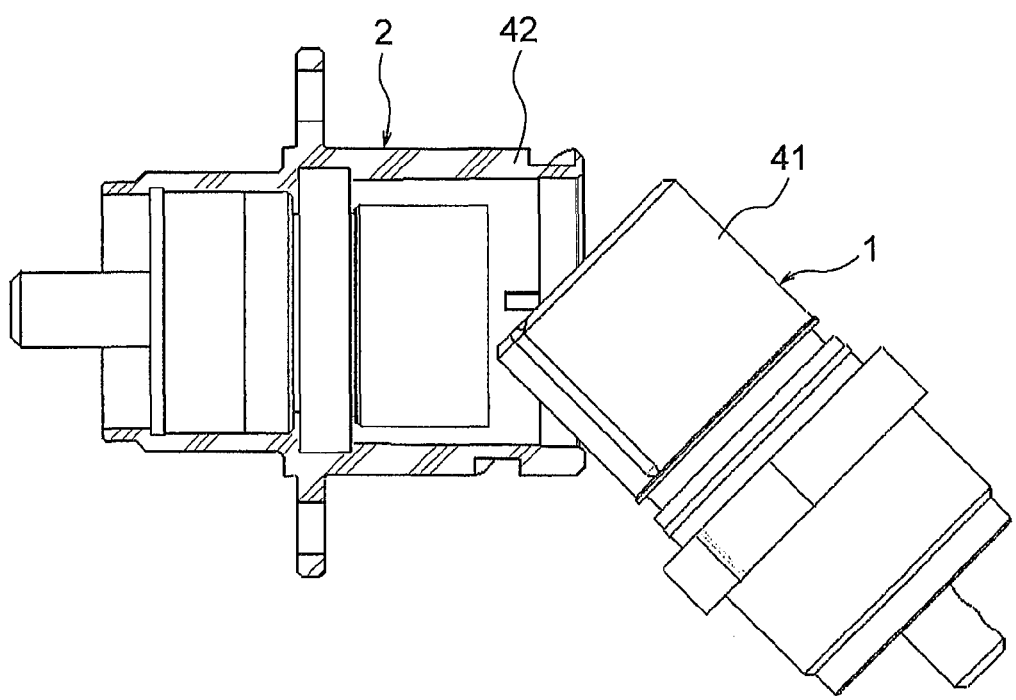
FIG. 19 is an explanatory diagram showing a state where the plug is obliquely butted against the receptacle shown in FIG. 2.

In FIG. 2, in order to connect the plug 1 and the receptacle 2 to each other, first, a barrel 41 of the plug 1 is fitted into a barrel 42 of the receptacle 2. Herein, with respect to the barrels 41 and 42, the receptacle-side shutter plate 34 is disposed more inward compared to the plug-side shutter plate 14. Accordingly, even if the plug 1 is obliquely butted against the receptacle 2 as shown in FIG. 19, the barrel 41 of the plug 1 is blocked by the barrel 42 of the receptacle 2 and thus does not interfere with the receptacle-side shutter plate 34. Therefore, even in this case, accidental opening of the receptacle-side shutter plate 34 is prevented.

Figure 3:
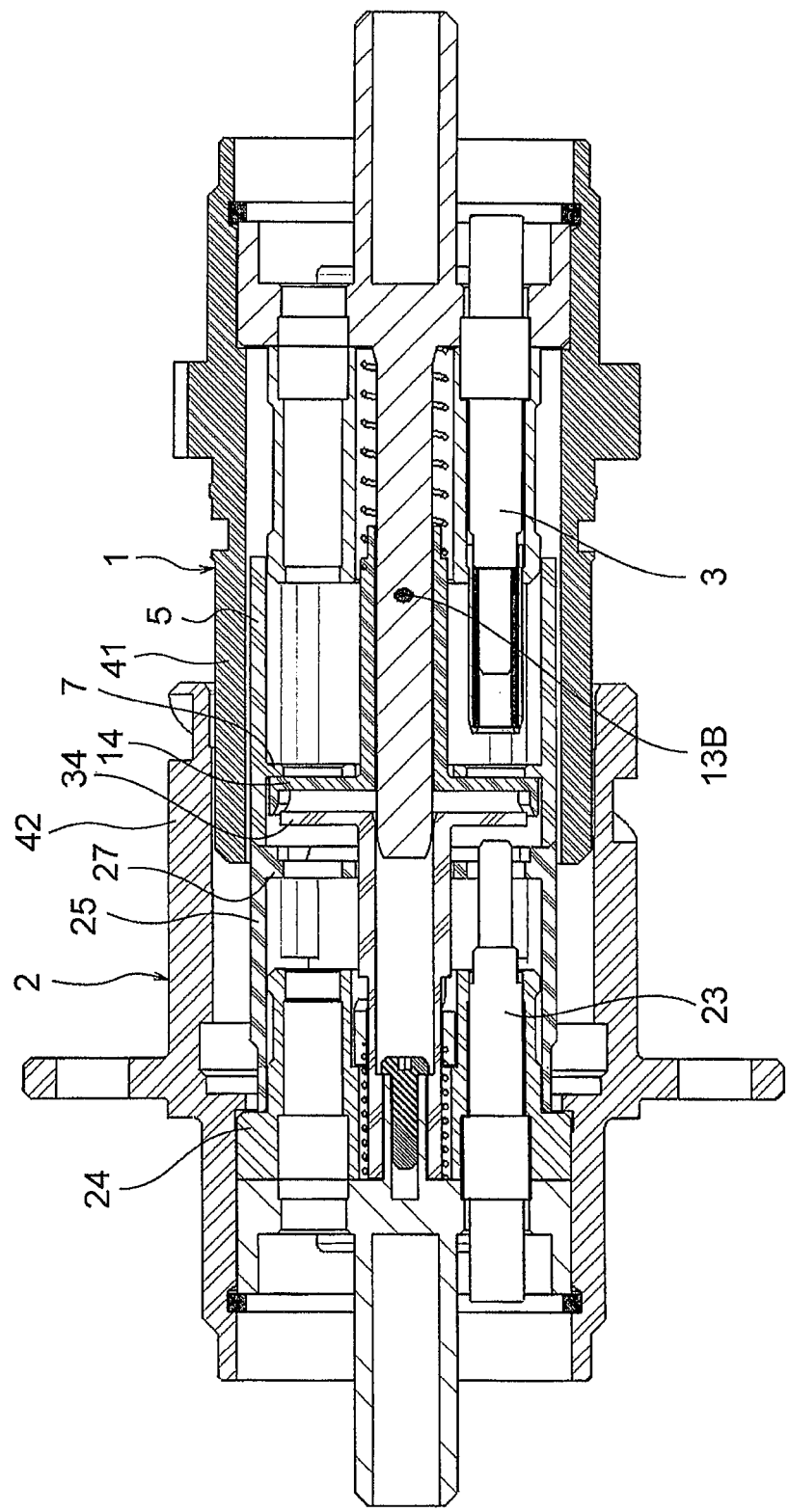
FIG. 3 is a longitudinal sectional view of the optical connector with shutters of FIG. 2 upon start of the connecting operation.

As shown in FIG. 3, when the barrel 41 of the plug 1 is properly fitted into the barrel 42 of the receptacle 2, the plug-side front housing 5 is brought into abutment with the receptacle-side front housing 25. As the fitting proceeds, first, the receptacle-side front housing 25 moves backward so that the projections 37 of the receptacle-side window plate 27 disengage from the openings 35 of the receptacle-side shutter plate 34. As a result, the locking of the receptacle-side shutter plate 34 is released.

Figure 4:
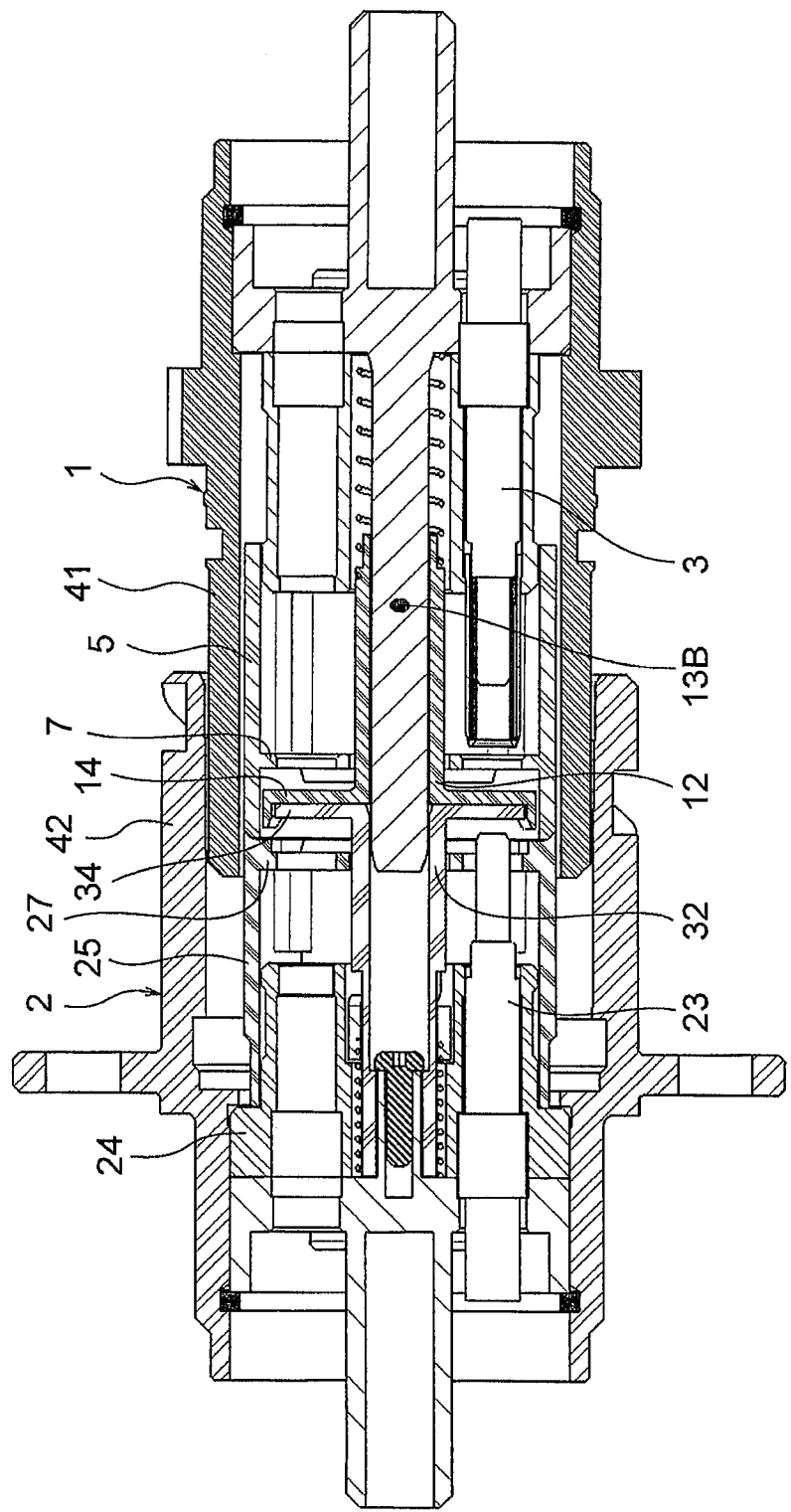
FIG. 4 is a longitudinal sectional view of the optical connector with shutters of FIG. 2 while the connecting operation is proceeding.

When the fitting further proceeds so that the receptacle-side front housing 25 abuts the receptacle-side rear housing 24 and stops, then, as shown in FIG. 4, the plug-side front housing 5 moves backward so that the projections 17 of the plug-side window plate 7 disengage from the openings 15 of the plug-side shutter plate 14. As a result, the locking of the plug-side shutter plate 14 is also released. Simultaneously, the plug-side shutter plate 14 and the receptacle-side shutter plate 34 abut each other so that the small convex portion 18 is fitted into the small concave portion 38. Consequently, the plug-side movable member 12 and the receptacle-side movable member 32 engage with each other in the circumferential direction to be coupled together.

When the plug 1 and the receptacle 2 are further pressed against each other, the cam groove 13A moves along the cam pin 13B so that the plug-side movable member 12 rotates while moving backward. In this event, since the small convex portion 18 and the small concave portion 38 are fitted together, the receptacle-side movable member 32 also rotates with the rotation of the plug-side movable member 12.

Consequently, when the plug-side movable member 12 and the receptacle-side movable member 32 are rotated at a predetermined angle, the openings 9 and the openings 29 are both opened. In this state, each of the plug-side shutter plate 14 and the receptacle-side shutter plate 34 is in a "shutter-opened" position (a second position). Herein, the fitting of the small convex portion 18 and the small concave portion 38 forms a linkage means for linking the plug-side shutter mechanism and the receptacle-side shutter mechanism with each other.

Figure 5:
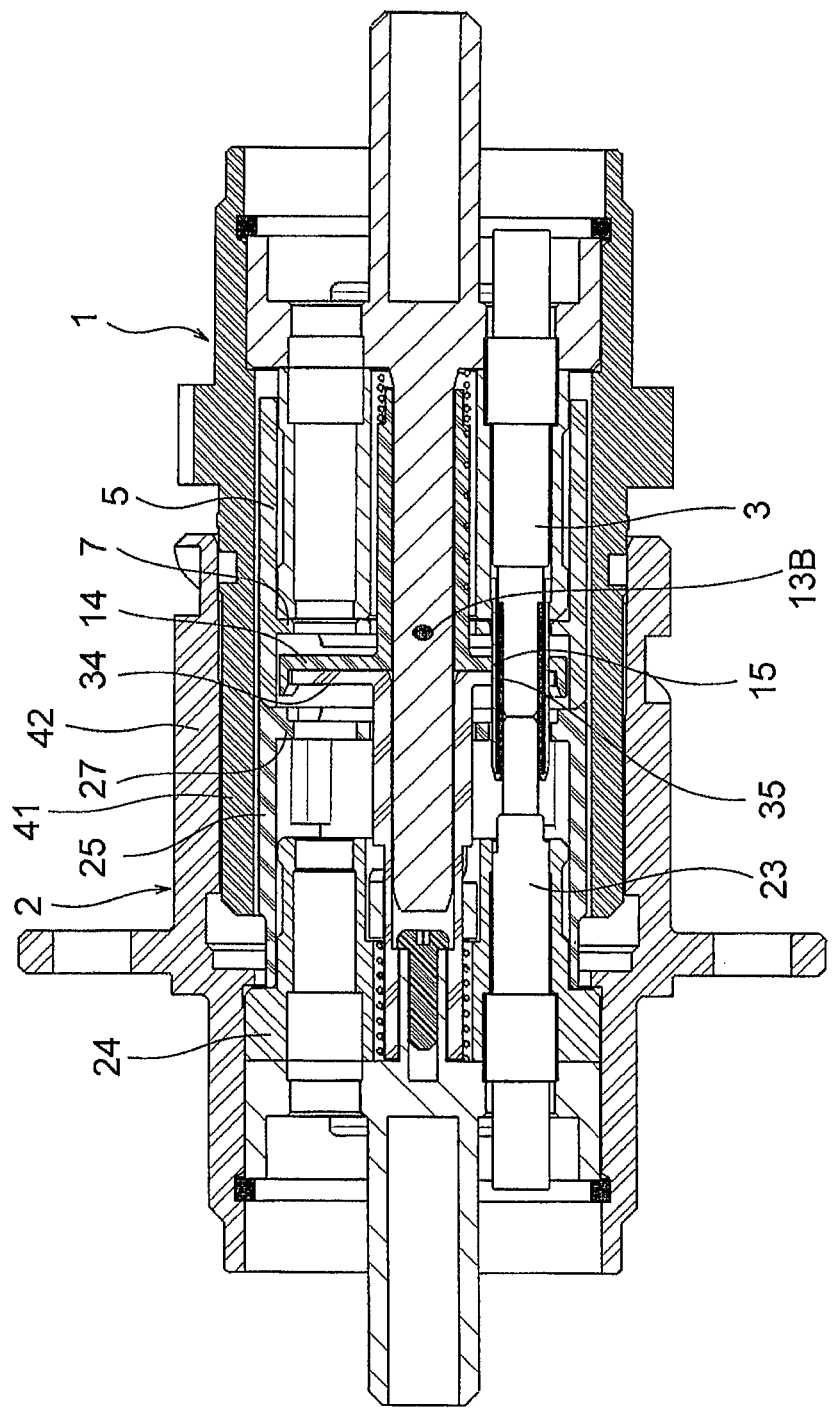
FIG. 5 is a longitudinal sectional view of the optical connector with shutters of FIG. 2 upon completion of the connecting operation.

Following the opening of the openings 9 and 29, as shown in FIG. 5, the optical socket contacts 3 proceed into the receptacle 2 through the openings 9 and 29 and are fitted over the optical pin contacts 23 so that the optical contact portions 8 and 28 are brought into contact with each other. In this manner, optical connection can be obtained by the plug 1 and the receptacle 2. When fitting the plug 1 and the receptacle 2 with each other, the shaft 11 is slidingly fitted into the receptacle-side movable member 32 so that the connecting operation is smoothly guided.

For releasing the connection between the plug 1 and the receptacle 2, the operation is carried out in a manner reverse to the above-mentioned connecting operation. Upon separation of the plug 1 and the receptacle 2 from each other, the plug-side movable member 12 is returned to the initial position by the push spring 13D in the plug 1. In this event, the plug-side movable member 12 is rotated to the initial state by the cooperative operation of the cam groove 13A and the cam pin 13B so that the projections 17 of the plug-side window plate 7 are fitted into the openings 15 of the plug-side shutter plate 14. As a result, the plug-side shutter plate 14 is locked.

On the other hand, in the receptacle 2, in the connected state, as shown in FIG. 17B, the convex portion 33A of the tubular portion 33 of the receptacle-side movable member 32 pushes the cam surface 33C of the cam member 33B so that the cam member 33B is moved to further compress the push spring 33D. Upon separation of the plug 1 and the receptacle 2 from each other, the receptacle-side shutter plate 34 is free to rotate. In this event, the cam member 33B is pushed to move in the axial direction by a restoring force of the push spring 33D so that the convex portion 33A slides along the cam surface 33C to rotate the receptacle-side shutter plate 34 to the initial state where the projections 37 of the receptacle-side window plate 27 are fitted into the openings 35 of the receptacle-side shutter plate 34. As a result, the receptacle-side shutter plate 34 is locked. Accordingly, when the connection between the plug 1 and the receptacle 2 is released, the receptacle-side shutter plate 34 is also surely returned to the "shutter-closed" state.

Naturally, the plug-side front housing 5 and the receptacle-side front housing 25 are separated from each other after the optical socket contacts 3 and the optical pin contacts 23 are separated from each other and further the plug-side shutter plate 14 and the receptacle-side shutter plate 34 are both returned to the "shutter-closed" state. Therefore, the optical contact portions 8 of the optical socket contacts 3 and the optical contact portions 28 of the optical pin contacts 23 are automatically protected so as to be dustproof and waterproof and thus it is possible to significantly reduce man-hours required for maintenance and management.

The above-mentioned optical connector with shutters can be used for connecting jumper cables between cars in a railroad car optical transmission system, connecting car pull-through cables, or connecting device wiring.

While the specific embodiment has been described above, it is needless to say that various changes can be made thereto. For example, the movement of the shutter mechanism of the plug is transmitted to the shutter mechanism of the receptacle in the above-mentioned embodiment, but conversely, the movement of a shutter mechanism of a receptacle may be transmitted to a shutter mechanism of a plug. Further, the number of openings and the number of optical contacts may be increased or decreased.

What is claimed is:

1. An optical connector comprising a plug and a receptacle adapted to be connected to each other in an axial direction,
   wherein each of the plug and the receptacle comprises:
   an optical contact; and
   a shutter mechanism for opening and closing a front of the optical contact in the axial direction,
   wherein the optical connector has linkage means for linking the shutter mechanism of the plug with the shutter mechanism of the receptacle when connecting the plug and the receptacle to each other,
   wherein at least one of the plug and the receptacle comprises:
   a movable member which is adapted to be moved with being pushed by the other of the plug and the receptacle when connecting the plug and the receptacle to each other;
   an urging member constantly urging the movable member toward the other of the plug and the receptacle in the axial direction; and
   a cam mechanism adapted to cause the shutter mechanism to follow movement of the movable member,
   wherein the shutter mechanism comprises:
   a shutter plate having an opening and movable between a first position where the opening does not face the optical contact in the axial direction and a second position where the opening faces the optical contact in the axial direction; and
   a projection adapted to be fitted into the opening when the shutter plate is in the first position,
   wherein the urging member and the cam mechanism are provided in only one of the plug and the receptacle, and
   wherein the shutter mechanism in the other of the plug and the receptacle is configured to be driven by the shutter mechanism in the one of the plug and the receptacle through the linkage means.

2. The optical connector according to claim 1, wherein the other of the plug and the receptacle comprises:
   a push spring; and
   a cam member adapted to be pushed to move by the push spring, thereby moving the shutter plate in the rotational direction to close the shutter mechanism.

3. The optical connector according to claim 2, wherein the other of the plug and the receptacle further comprises:
   a rotary shaft coupled to the shutter plate; and
   a convex portion provided at a periphery of the rotary shaft, and
   wherein the cam member has a cam surface which is in contact with the convex portion.

4. The optical connector according to claim 1, wherein the plug and the receptacle respectively comprise barrels which are adapted to be fitted with each other when connecting the plug and the receptacle to each other, and
   wherein, with respect to the barrels, the shutter plate in the other of the plug and the receptacle is disposed more inward compared to the shutter plate in the one of the plug and the receptacle.

5. An optical connector comprising a plug and a receptacle adapted to be connected to each other in an axial direction,
   wherein each of the plug and the receptacle comprises:
   an optical contact; and
   a shutter mechanism for opening and closing a front of the optical contact in the axial direction,
   wherein the optical connector has linkage means for linking the shutter mechanism of the plug with the shutter mechanism of the receptacle when connecting the plug and the receptacle to each other,
   wherein at least one of the plug and the receptacle comprises:
   a movable member which is adapted to be moved with being pushed by the other of the plug and the receptacle when connecting the plug and the receptacle to each other;
   an urging member constantly urging the movable member toward the other of the plug and the receptacle in the axial direction; and
   a cam mechanism adapted to cause the shutter mechanism to follow movement of the movable member,
   wherein the shutter mechanism comprises:
   a shutter plate having an opening and movable between a first position where the opening does not face the optical contact in the axial direction and a second position where the opening faces the optical contact in the axial direction; and
   a projection adapted to be fitted into the opening when the shutter plate is in the first position,
   wherein the cam mechanism moves the movable member in a rotation direction in response to movement of the movable member in the axis direction,
   wherein the shutter plate is formed integral with the movable member,
   wherein each of the shutter mechanisms further comprises a window plate between the optical contact and the shutter plate,
   wherein the window plate is separated from the movable member and has an opening facing the optical contact in the axial direction, and
   wherein the projection is protruded from the window plate towards the shutter plate.

6. The optical connector according to claim 5, wherein the projection is snugly fittable into the opening of the shutter plate.

7. The optical connector according to claim 5, wherein each of the projection and the opening of the shutter plate is formed into a circular truncated cone shape.

8. The optical connector according to claim 5, wherein the projection has a height substantially equal to a thickness of the shutter plate.

9. An optical connector comprising a plug and a receptacle adapted to be connected to each other in an axial direction,
   wherein each of the plug and the receptacle comprises:
   an optical contact; and
   a shutter mechanism for opening and closing a front of the optical contact in the axial direction,
   wherein the optical connector has linkage means for linking the shutter mechanism of the plug with the shutter mechanism of the receptacle when connecting the plug and the receptacle to each other,
   wherein at least one of the plug and the receptacle comprises:

a movable member which is adapted to be moved with being pushed by the other of the plug and the receptacle when connecting the plug and the receptacle to each other;

an urging member constantly urging the movable member toward the other of the plug and the receptacle in the axial direction; and a cam mechanism adapted to cause the shutter mechanism to follow movement of the movable member, wherein the shutter mechanism comprises:

a shutter plate having an opening and movable between a first position where the opening does not face the optical contact in the axial direction and a second position where the opening faces the optical contact in the axial direction; and a projection adapted to be fitted into the opening when the shutter plate is in the first position, wherein the plug and the receptacle respectively comprise holding members each holding the optical contact, and wherein the holding members each have a stepped portion supporting the optical contact.

10. An optical connector comprising a plug and a receptacle adapted to be connected to each other in an axial direction, wherein each of the plug and the receptacle comprises:

an optical contact; and a shutter mechanism for opening and closing a front of the optical contact in the axial direction, wherein the optical connector has linkage means for linking the shutter mechanism of the plug with the shutter mechanism of the receptacle when connecting the plug and the receptacle to each other, wherein at least one of the plug and the receptacle comprises:

a movable member which is adapted to be moved with being pushed by the other of the plug and the receptacle when connecting the plug and the receptacle to each other;

an urging member constantly urging the movable member toward the other of the plug and the receptacle in the axial direction; and a cam mechanism adapted to cause the shutter mechanism to follow movement of the movable member, wherein the shutter mechanism comprises:

a shutter plate having an opening and movable between a first position where the opening does not face the optical contact in the axial direction and a second position where the opening faces the optical contact in the axial direction; and a projection adapted to be fitted into the opening when the shutter plate is in the first position, wherein the plug and the receptacle respectively comprise holding members each holding the optical contact, wherein the movable members are each fitted around an outer periphery of a corresponding one of the holding members, and wherein the holding members each have a recessed portion on the outer periphery.

* * * * *